No. 858,337. PATENTED JUNE 25, 1907.
J. GARCIA.
FIBER CLEANING MACHINE.
APPLICATION FILED MAY 27, 1904.
3 SHEETS—SHEET 1.
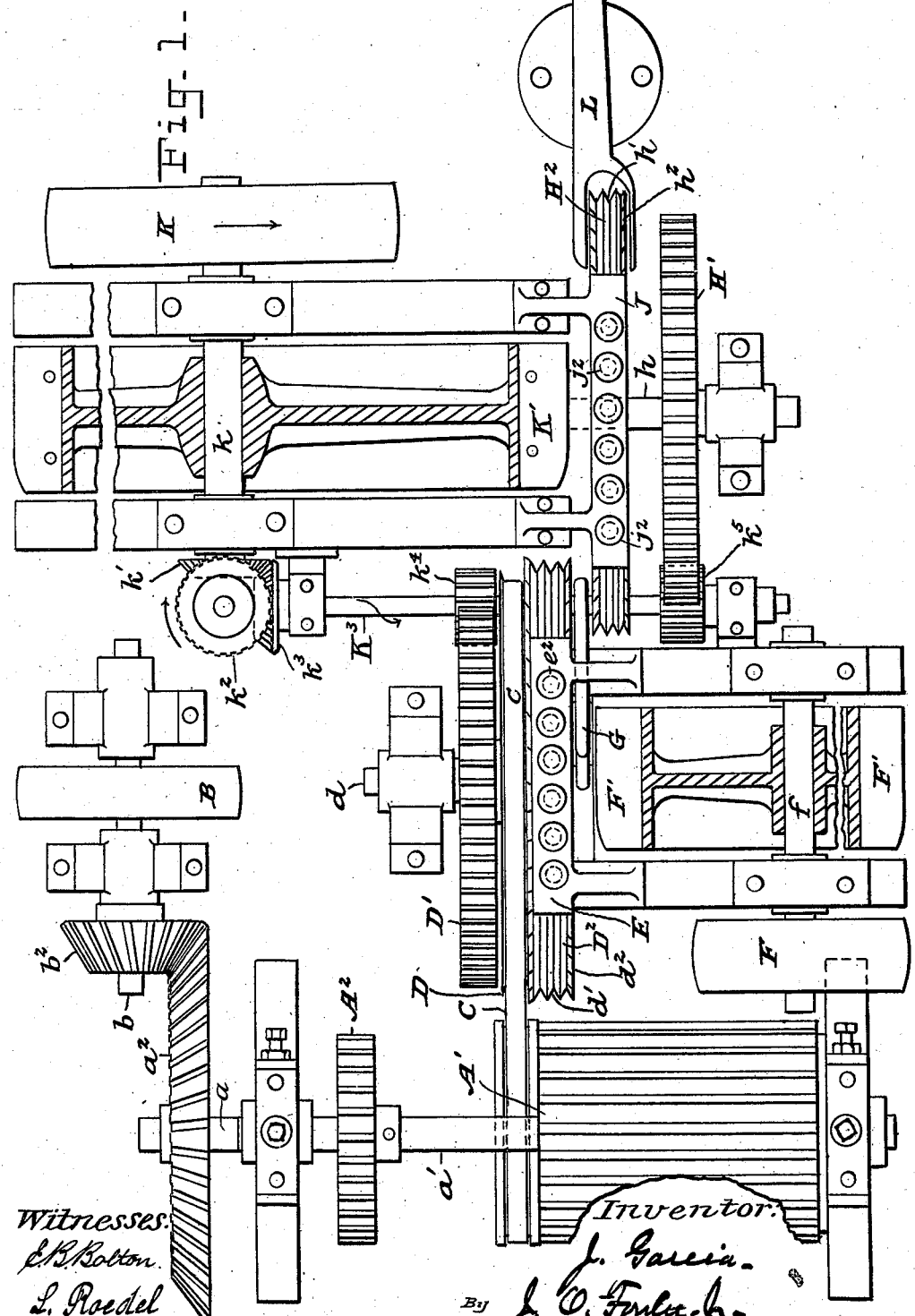

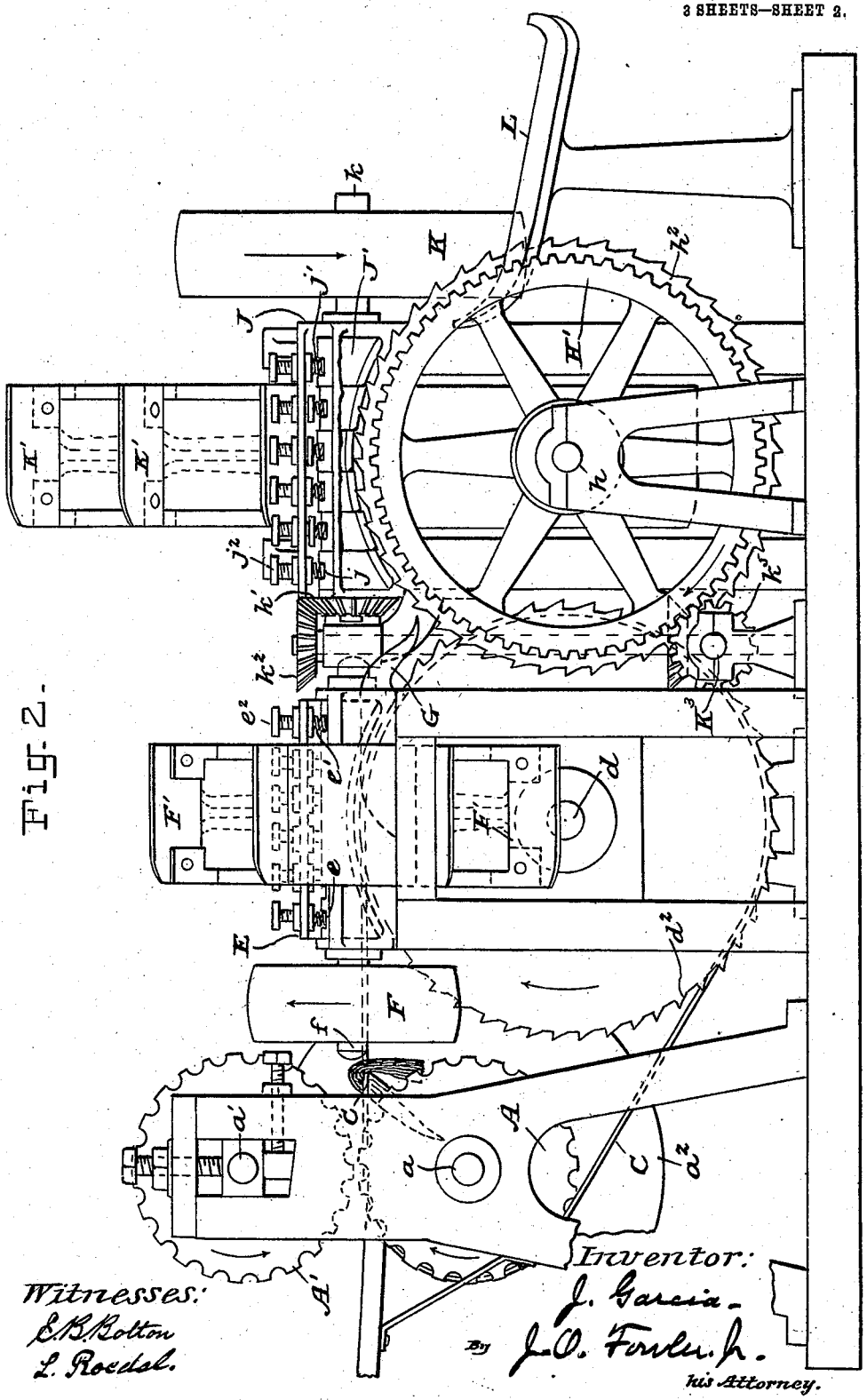

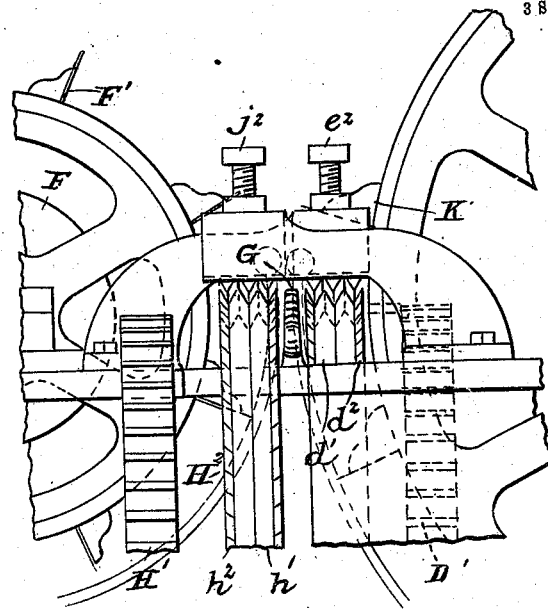
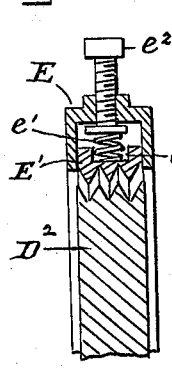
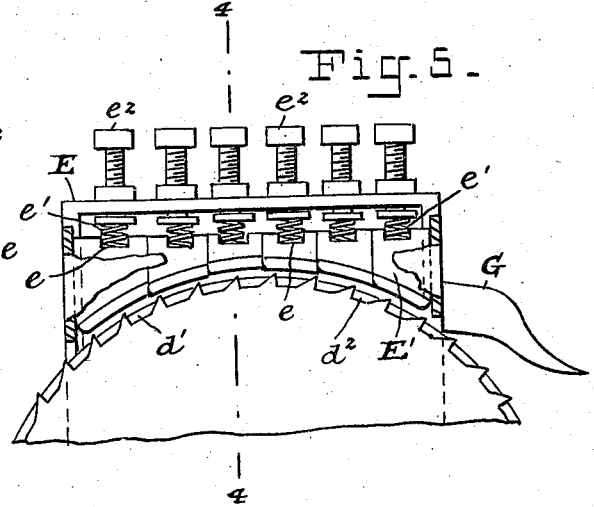

UNITED STATES PATENT OFFICE.

JOSEPH GARCIA, OF BROOKLYN, NEW YORK.

FIBER-CLEANING MACHINE.

No. 858,337.

Specification of Letters Patent.

Patented June 25, 1907.

Application filed May 27, 1904. Serial No. 210,055.

*To all whom it may concern:*

Be it known that I, JOSEPH GARCIA, a citizen of the United States of America, and a resident of Brooklyn, in the county of Kings and State of New York, certify that I have invented a certain new and useful Fiber-Cleaning Machine, of which the following is a specification.

My invention relates to an apparatus for separating the filamentous substance from the long leaf agaves, and in particular henequen, sacqui or sisal hemp, and other similar long fiber producing plants, and it has for its object the provision of an apparatus of the kind set forth comparatively simple in construction, inexpensive to manufacture and which operates smoothly and efficiently in practical use.

To attain the desired end, this, my invention consists in novel devices and combinations of devices hereinafter described.

In order to enable my invention to be fully understood, I will proceed to explain the same by reference to the drawings which accompany and form a part of this specification, in which Figure 1 represents a plan view of a fiber cleaning machine constructed according to my invention the feed table shown in Fig. 2 being omitted; Fig. 2 is a side elevation of the same; and Figs. 3, 4 and 5 are views in detail of my gripping device.

Like letters of reference indicate like parts in all the views.

I have found it desirable to make an apparatus by the use of which the following operations may be combined in, and automatically performed by, a single machine, namely:—first, the plants are crushed so that the stalks and leaves shall be of a practically uniform thickness in order to secure economy of power in operating the machine; second, the plants are carried through the machine and supported loosely by a suitable conveying means or carrier; third, the middle of the plants is caught by a positively acting, holding, or gripping device, while one end (preferably nearly one half of the whole length) of the plants is decorticated or cleaned; fourth, the plants are moved transversely a short distance as regards the second cleaning mechanism by the gripping device; fifth, the cleaned or extracted fibers are caught by another positively acting gripping device, while the remaining part of the plants (being ordinarily a little more than one half in length) is cleaned by the scraping wheel; and, finally, the cleaned fibers are discharged upon a suitable holding device; and I have, therefore, constructed according to my invention an apparatus of the class described, embodying the preferred construction of parts, and their mutual relationship, combination, arrangement and organization in a composite body or structure, as hereinafter described.

Referring particularly to the drawings A A' denote my crushing rollers located at the end of the feeding table and preferably bearing corrugated faces and supported by shafts $a$, $a'$. The rollers A, A', are ordinarily made of a length equal to about one half of the length of the leaves to be treated, the thinner ends of the said leaves being fed between the gears $A^2$ also carried by the said shafts $a$ and $a'$. The shaft $a$ is also provided with a bevel gear $a^2$ which meshes into the bevel gear $b^2$ carried by the shaft $b$ which is rotated by means of the pulley B.

The crushing roller A is ordinarily somewhat longer than the roller A' and carries in a peripheral groove a belt C which encircles the same and also the pulley D which with the gear D', together with the grip wheel $D^2$ are rigidly mounted upon the shaft $d$. The belt C serves as a carrier or conveying means to receive the leaves after the same leave the feed table, and to carry the same to the grip wheel $D^2$. The grip wheel $D^2$ is formed with peripheral longitudinal grooves or corrugations $d'$ and has, preferably located at the edges thereof, serrations $d^2$. Superimposed on the toothed grip wheel or wheel carrier $D^2$ for moving the plant and constructed and arranged to coact therewith are a series of yielding blocks or platens E' supported in a frame E forming each a segment of an arc whose center is the same as that of said wheel and the lower faces of the blocks being corrugated or grooved to register with the corrugations $d'$ of the wheel $D^2$. Recesses $e$ are formed in the said blocks to contain springs $e'$, by means of which springs $e'$ and the controlling screws $e^2$, which work in the frame E, a predetermined pressure may be applied individually to the blocks E', the said elastic means thus serving to hold the said blocks into approximate contact with the wheel with an increased or decreased elastic pressure at will.

The cleaning or scraping wheel F' carries scrapers and knives of the ordinary description and serves in connection with the adjacent ordinary plate or shoe to clean the thicker end of the leaves which, as stated, are supported by the grip wheel and the blocks. The cleaning wheel F' is mounted on a shaft $f$ which is rotated by the pulley F. As the leaves are moved forward by the grip wheel $D^2$ and while still held between the said grip wheel and the blocks E' the cleaned fibers will pass over onto the horizontal top portion of a plate G.

Any given point at the highest point of the grip wheel $D^2$ lies adjacent to the top of the horizontal portion of the plate G which extends under the cleaned fibers. But as that point on the periphery of the grip wheel descends in the course of the revolution of the said wheel, it will gradually move away from the top of the plate G and the distance between the two will be constantly increased. Consequently by the time that the leaves pass away from between the grip wheel $D^2$ and the blocks E', the fibers will be moved transversely across the plate G until the part of the cleaned fibers that rests upon the said plate G will be quite a distance from the uncleaned part of the leaves just being released from the gripping device. That is to say the point at which the leaves are supported is moved transversely as regards the said leaves by the action of the gripping device. The series of yielding blocks E' allow for the inequalities of the thickness of the leaves. At the time the leaves emerge from between the grip wheel $D^2$ and the blocks E' they will pass down the depending hook or prong at the end of the plate G and the cleaned portion of the same will be caught between the grip wheel $H^2$ and the yielding blocks J'. The grip wheel $H^2$ has peripheral corrugations $h'$ and serrations $h^2$ at the edges thereof, and the superimposed blocks J' are held in a frame J and are formed with recesses $j$ in which are located springs $j'$, the tension of which may be adjusted by the screws $j^2$ which work in the frame J, and the said blocks are also formed with corrugations to register with the corrugations of the grip wheel $H^2$. When the remaining portions of the leaves have been cleaned by the scraper K', the leaves are released by the grip wheel $H^2$ and blocks J' and the same are deposited upon suitable holding means as the hook L. The scraper K' carries suitable knives and scrapers and is mounted upon a shaft $k$ which is rotated by the pulley K. At the end of this shaft is located a bevel gear $k'$ which meshes with the bevel gear $k^2$ mounted on a vertical shaft and provided at its lower end with another bevel gear which meshes with the bevel gear $k^3$ on the shaft $K^3$. The latter shaft carries gears $k^4$ and $k^5$ which respectively rotate the gears D', H' on the shafts $d$ and $h$.

It will be observed that the series of blocks E' and J' constitute flexible platens. These blocks form with respect to the wheels $D^2$ and $H^2$ a series of superimposed differential devices each constructed and arranged to yield respectively a greater or less degree and to move away from the periphery of the wheel a distance according to the thickness of the leaves to be treated; which blocks coact with and work in the plane of the said wheel. The second gripping device receives the leaves directly from the first gripping mechanism, the said first gripping device being constructed and arranged to deliver the cleaned portions of the leaves to the second gripping device a little to one side of the path previously followed by the leaves. This change of the position of the leaves is caused by means located adjacent to the first gripping device, in the present embodiment consisting of the arm or plate G, which device causes parts of the leaves to be drawn away from the plane of the second gripping device.

It will be observed that the blocks or platens E' or J' form, in connection with the movable carriers $D^2$ or $H^2$, a co-operating means which is elastically held in approximate contact and sliding engagement with the said movable carrier so as to be differentially yieldable at different points of the carrier, whereby plants of varying thicknesses may be grasped and rigidly held between the said carrier and co-operating means.

As it is evident that many changes in the construction, form, proportion, and relative arrangement of parts might be resorted to without departing from the spirit and scope of my invention, I would have it understood that I do not restrict myself to the particular construction and arrangement of parts shown and described, but that such changes and equivalents may be substituted therefor, and that, I do not claim the gripping mechanism in this application, as that forms the subject matter of my application Serial No. 320,210, filed June 4, 1906.

What I claim as my invention is:—

1. In a fiber cleaning machine, crushing rollers, a wheel to directly grip the leaves, a belt to directly connect the said roller and grip wheel, and cleaning means located opposite the said grip wheel.

2. In a fiber cleaning machine, a cleaning mechanism, means located opposite the same to grip the leaves and to move the same transversely of or across the machine in a practically horizontal direction and at right angles to the axis of the cleaning mechanism, a second gripping device, and a cleaning mechanism located opposite the latter.

3. In a fiber cleaning machine, a gripping device, an oppositely disposed cleaning mechanism, a second gripping device to receive the leaves treated by the first cleaning mechanism, a cleaning mechanism located opposite the second gripping device, and means located adjacent to the first gripping device to coact with the said device to cause the leaves to be drawn transversely and practically horizontally across the plane of the second gripping device, while still held in the first gripping mechanism.

4. In a fiber cleaning machine, a gripping device, and an oppositely disposed cleaning mechanism, a second gripping device and an oppositely disposed cleaning mechanism, and means intermediate the two gripping devices to cause parts of the leaves to be drawn transversely across the plane of the second gripping device so that the second gripping device will bite the cleaned portion or fiber of the leaves treated by the first cleaning mechanism, and consisting of an arm or plate constructed and arranged to support the leaves in such a manner that the action of the first named gripping device will draw the leaves across the said arm.

5. In a fiber cleaning machine, a cleaning device, a support for the leaves the rear portion of which extends downwardly, and a gripping device to hold the leaves while being cleaned, and to draw them across the support, and then entirely release the said leaves to allow the same to slide downwardly on the said support in combination with a second gripping and cleaning mechanism.

6. In a fiber cleaning machine, a gripping device, a second gripping device, and an intermediate leaf supporting arm or plate, the rear portion of which extends downwardly, the first gripping device being constructed and arranged to hold the leaves while being cleaned, and to move the leaves transversely across the said arm relative to the second gripping device, and to deliver the moved leaves to the latter.

7. In a fiber cleaning machine, a gripping device, a second gripping device, an intermediate leaf supporting arm or plate the rear portion of which extends downwardly, the first gripping device being constructed and arranged to hold the leaves while being cleaned, and to move the leaves transversely across the said arm and to deliver the moved leaves to the second gripping device, each of said gripping devices consisting of a wheel and a series of superimposed yielding devices.

8. In a fiber cleaning machine, a gripping device, cleaning means, crushing rollers to crush a portion of the leaves, and leaf supporting gears to hold the uncrushed portion of the leaves placed in alinement with the crushing roller.

In testimony of the foregoing specification I do hereby sign the same in the city of New York, county and State of New York this 6th day of May 1904.

JOSEPH GARCIA.

Witnesses:
    ROB. SCHWARZ,
    J. ODELL FOWLER, Jr.